June 30, 1931.  G. A. BURNHAM  1,811,877

ELECTRIC CURRENT LIMITING REACTOR

Filed Dec. 31, 1927

Inventor.
George A. Burnham
atty

Patented June 30, 1931

1,811,877

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC CURRENT LIMITING REACTOR

Application filed December 31, 1927. Serial No. 243,901.

This invention relates to current limiting reactors inserted in distribution lines for the purpose of limiting the amount of current that can flow through the line on a short circuit or otherwise abnormally loaded condition thereof.

The reactors with which this invention is particularly concerned are usually of the multi-turn and multi-layer type, the conducting turns of which are supported upon a suitable frame work. The magnetic stresses which act on the conductors of the reactor on short circuit can be very severe and in many instances the conductors and their supports have been broken loose by the magnetic forces of the reactor and have destroyed the reactor and have caused damage to the station in which the reactor is contained. It is an object of the present invention to provide a reactor wherein the conductor-convolutions thereof are supported in such a manner as to prohibit harmful displacement of the convolutions under abnormal current conditions.

A further object of the invention is to provide a reactor wherein the conductor-convolutions are embedded in and are supported against displacement due to magnetic reactions thereon by a mobile body of solid insulating material.

A further object is the provision of a reactor wherein the conductor-convolutions thereof are embedded in a body of sand, which sand constitutes means to shield the conductor-convolutions against access thereto of a conducting gas.

A further object is generally to improve the construction of current limiting reactors.

Figure 1:
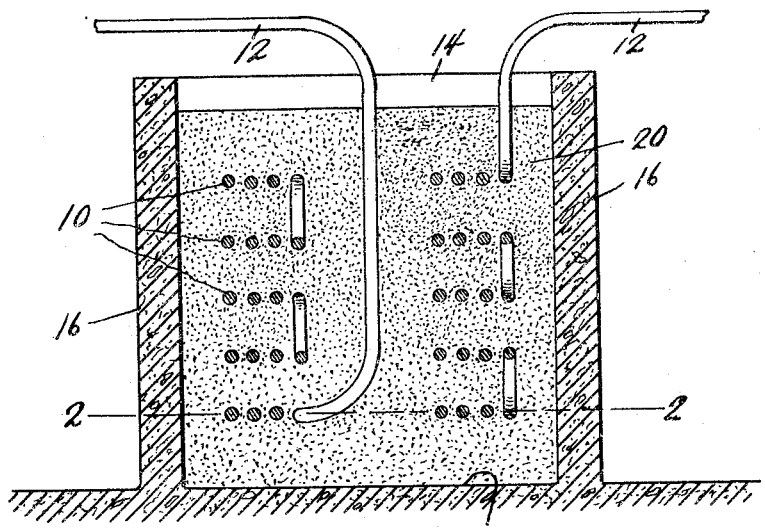
Figure 1 is a cross sectional elevation of a current limiting reactor embodying this invention.
Figure 2:
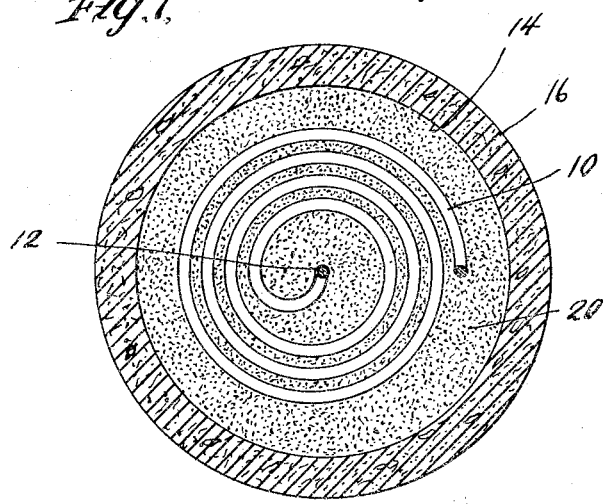
Figure 2 is a section along line 2—2 of Fig. 1.

As here shown, the reactor comprises a plurality of superposed cylindrical layers 10 of a conductor 12, each layer comprising a plurality of turns with the conductor continuous in the superimposed layers and the direction of current flow in the convolutions such that the magnetic effects of the convolutions in the layers are additive. The reactor is contained within a cylindrical well 14 which is open at the top and has a side wall 16 and a bottom wall 18 both of which may be composed of cement. In accordance with this invention, the convolutions of the reactor are embedded in a body 20 of sand which occupies the space between each layer and each convolution of each layer and also is under and over the reactor and between the coils of the reactor and the side wall. The spacing between the convolutions and the layers, and also between the conducting elements of the reactor and the side walls is such as to provide adequate distance to prevent flash over between the various parts with air as the dielectric between them. While sand may increase the resistance to flash over to some extent, it is not herein relied upon to improve the insulation of the reactor. The main function of the sand body is to support the conducting elements of the reactor against displacement due to the magnetic forces of the reactor and to shield the conducting elements from contact with a conducting gas.

The reactor can be constructed in any suitable manner. It may be, for instance, constructed by first placing a body of dry sand in the bottom of the well up to a level to be occupied by the lowermost layer 10. The conductor may then be wound in an open spiral on the top surface of the bed of sand until a sufficient number of convolutions have been formed. Sand may be placed on top of this lowermost layer and if necessary tamped down to make a solid mass both over and under and between the convolutions. The next convolution is then wound in a similar manner and more sand is added and so on until the last layer is formed whereupon the well can be filled with sand to a suitable height above the reactor.

The magnetic forces acting upon the conductor elements tend to cause the convolutions in each layer to assume a circular form and also tend to move together the various convolutions. This movement or displacement is suppressed by the sand since the sand can not move outwardly because it is held from such movement by the side walls 16 and the body of sand above the top layer. The sand cannot move in the direction of the vertical axis of the reactor since it is held from such movement by the walls of the reactor and the body of sand above the topmost convolution. Consequently, the reactor convolutions are supported against movement and against damage that might otherwise be caused by an excessive current traversing the reactor. The reactor is also cheap to manufacture since it does not need any machined parts in its construction.

The sand not only provides the support for the convolutions of the reactor winding but it further provides means to prevent access of hot arc gases to the bare high tension conductors, particularly those gases issuing from oil immersed electric switches, which may deposit carbon. The sand is effective for this purpose as it cools the hot gases as they penetrate between outer particles of the sand body and as the sand particles offer considerable resistance to the flow of gas thereinto. Carbon particles are entrapped in the voids in the particles near the outermost surfaces of the sand and so cannot penetrate the sand body to a sufficient depth to cause a flashover path between adjacent conductors.

The sand comprising the support for the reactor convolutions is preferably a dry quartz sand reasonably free from foreign matter and also from metallic compounds that might impair the insulating property thereof. The size of the sand particles can be varied within rather wide limits, although at present I prefer to use a sand, the grains of which are around ½ mm. in thickness. Preferably, the sand should be a sharp sand so that the particles can bed together and thus resist displacement. Preferably, also, in the case of relatively high voltage systems, the sand should be of such fineness that corona will be absent in the voids between the sand particles, the electrostatic flux choosing to traverse the sand particles due to their high dielectric capacity rather than through the higher resistance path in the voids between the sand particles.

The use of loose sand for this particular purpose also has the advantage that it can be displaced sufficiently to permit the conductor convolutions a slight amount of movement so that they can assume a position of magnetic balance and yet prevents them from being materially displaced due to heavy currents which traverse them. The sand body also permits the entire structure to "breathe" due to temperature variations, without any building up of gas pressure or undue mechanical stresses in the apparatus. The sand body is not sensibly moisture-absorbent as the voids between the sand particles are too large to be filled with water by capillary action.

The particular form of reactor can, of course, be varied from that here shown to suit specific requirements without departure from the spirit of the invention.

I claim:

1. An electric current limiting reactor having a plurality of conductor convolutions and a mobile body of solid loose discrete particles of insulating material in which said conductor convolutions are embedded, said mobile body providing a mechanical support for said convolutions against displacement due to the magnetic forces of the reactor and also constituting means to shield said conductor convolutions against access thereto of a conducting gas.

2. An electric current limiting reactor comprising a plurality of spaced conductor layers, each layer having a plurality of convolutions, and a mobile body of solid loose discrete particles of insulating material in which said layers are embedded, said mobile body occupying the space between said layers and providing mechanical support therefor against displacement due to the magnetic forces of the reactor.

3. An electric current limiting reactor comprising a plurality of spaced conductor convolutions and a body of loose sand in which said conductor convolutions are embedded and which constitutes supporting means for said convolutions by which the convolutions are held from displacement due to the magnetic forces of the reactor and which also constitutes means to shield said conductor convolutions from access thereto of a conducting gas.

4. An electric current limiting reactor comprising an enclosing wall providing a well, a reactor contained within said well, and a body of loose sand occupying said well and in which said reactor is embedded, said body of sand providing support for the conductor elements of said reactor and also constituting means to shield said reactor against access thereto of a conducting gas.

5. An electrical apparatus having a current-carrying winding, and a body of loose sand in which said winding is embedded and by which said winding is shielded against access thereto of a conducting gas.

6. An electrical apparatus having a current-carrying winding composed of a number of spaced convolutions and a body of loose sand in which said convolutions are embedded, said sand occupying the space between and providing the sole support for the several convolutions of said winding and also constituting means to shield said winding against access thereto of a conducting gas.

In testimony whereof, I have signed my name to this specification.

GEORGE A. BURNHAM.